US008023570B2

(12) United States Patent
Wornell et al.

(10) Patent No.: US 8,023,570 B2
(45) Date of Patent: Sep. 20, 2011

(54) SYSTEM AND APPARATUS FOR ERROR CONTROL CODES BASED ON LAYERING AND LINEAR TRANSFORMATIONS

(75) Inventors: Gregory W. Wornell, Wellesley, MA (US); Mitchell Trott, San Mateo, CA (US); Uri Erez, Tel Aviv (IL)

(73) Assignee: Massachusetts Institute of Technology, Cambridge, MA (US)

( * ) Notice: Subject to any disclaimer, the term of this patent is extended or adjusted under 35 U.S.C. 154(b) by 770 days.

(21) Appl. No.: 12/027,005

(22) Filed: Feb. 6, 2008

(65) Prior Publication Data

US 2009/0110106 A1    Apr. 30, 2009

Related U.S. Application Data

(60) Provisional application No. 60/888,399, filed on Feb. 6, 2007.

(51) Int. Cl.
  *H04B 14/04* (2006.01)
  *H04K 1/10* (2006.01)
  *H04L 27/28* (2006.01)
(52) U.S. Cl. ........................ 375/253; 375/260
(58) Field of Classification Search ............. 375/240.23, 375/240.24, 241, 242, 246, 253, 260, 265, 375/267, 299
See application file for complete search history.

(56) References Cited

U.S. PATENT DOCUMENTS

2003/0048857 A1*  3/2003  Onggosanusi et al. ........ 375/267
2006/0093067 A1*  5/2006  Jalali et al. ..................... 375/299
2007/0211672 A1*  9/2007  Song et al. ..................... 370/335

OTHER PUBLICATIONS

Niesen et al.; "Rateless Codes for the Gaussian Multiple Access Channel;" IEEE Global Telecommunications Conference, 2006, San Francisco, CA, USA; Nov. 27-Dec. 1, 2006; 5 pages.
Sanechi; "Universal Codes for Parallel Gaussian Channels;" Submitted to the Dept. of Electrical Engineering & Computer Science of the Massachusetts Insititute of Technology on May 12, 2006; 93 pages.
Erez et al.: "Faster-than-Nyquist Coding: The Merits of a Regime Change;" in Proc. Allerton Conference Commun. Contr., and Computing; Illinois; Oct. 2004; pp. 1-10.
Erez et al.; "Rateless Coding and Perfect Rate-Compatible Code for Gaussian Channels;" Information Theory, 2006 IEEE International Symposium On: Jul. 2006; 5 pages.

* cited by examiner

*Primary Examiner* — Young T. Tse
(74) *Attorney, Agent, or Firm* — Chapin IP Law, LLC (57) ABSTRACT

A powerful new class of methods for encoding digital data for reliable transmission over unreliable communication channels is described. With this method, the message bits are divided into multiple submessages and the bits in each layer are encoded using a standard error correction code to provide a plurality of subcodewords. A first linear transformation is applied to each of the subcodewords. The so-transformed subcodewords from the different submessages are then combined to form a first redundancy block to be transmitted. Additional redundancy blocks are generated by repeating this process on the same message but with jointly related nonidentical sets of linear transformations. The result is a set of codewords for each message which are then used to generate a transmitted waveform in one of several different ways, depending upon the application. For example, the codewords can be used in sequence (temporally) to form a rateless code for transmission over channels of unknown quality, in which case a receiver accumulates as many of the codewords as are necessary to successfully decode. As another example, the codewords can be spatially distributed if the channel has multiple-inputs, as would be the case in a multi-antenna system. As still another example, the codewords can be distributed over subchannels in a frequency-division multiplexing system.

24 Claims, 4 Drawing Sheets

SYSTEM AND APPARATUS FOR ERROR CONTROL CODES BASED ON LAYERING AND LINEAR TRANSFORMATIONS

CROSS-REFERENCE TO RELATED APPLICATIONS

This application claims the benefit under 35 U.S.C. §119 (e) of provisional application No. 60/888,399 filed on Feb. 6, 2007 which application is hereby incorporated by reference in its entirety.

GOVERNMENT GRANT

This invention was made with government support under grant number CCF0515122 awarded by the National Science Foundation. The government has certain rights in this invention.

FIELD OF THE INVENTION

The invention relates to encoding digital data for reliable transmission over communication channels.

BACKGROUND OF THE INVENTION

As is known in the art, error-control coding converts a message into a sequence of symbols in such a manner that the message can be accurately recovered from the symbols even when received in the presence of noise or other impairments.

SUMMARY OF THE INVENTION

In accordance with the present invention, a powerful new class of techniques for encoding digital data for reliable transmission over noisy or otherwise unreliable communication channels is described.

In one aspect, a technique for encoding a message for transmission over a communication channel includes creating submessages from the message, encoding the submessages into subcodewords, selecting a first set of linear transformations wherein the first set of linear transformations includes at least one linear transformation for each subcodeword, applying the first selected set of linear transformations to the subcodewords to provide first transformed subcodewords and combining the first transformed subcodewords to form a first redundancy block to be transmitted. The technique further includes selecting a second set of linear transformations with the second set of linear transformations including at least one linear transformation per subcodeword and the second set of linear transformations being jointly related and nonidentical to the first selected set of linear transformations, applying the second selected set of linear transformations to subcodewords to provide a second transformed subcodewords and combining the second transformed subcodewords to form a second redundancy block to be transmitted.

With this arrangement, a technique for encoding messages for transmission over a communication channel is provided. By forming plural redundancy blocks by first encoding a message into plural subcodewords and then applying nonidentical sets of linear transformations to the plural subcodewords, the resulting code can, in one embodiment, be arranged to have good performance while using only a small number of subcodewords.

In one embodiment, the first and second sets of selected linear transformations are provided as multiplications by constants. Multiplication by a constant is simple to implement and allows precise control of the joint relationship between the linear transformations.

The result is a set of redundancy blocks for each message which are then used to generate a waveform for transmission in one of several different ways, depending upon the particular application. For example, the redundancy blocks can be used in sequence (temporally) to form a rateless code for transmission over a channel of unknown quality, in which case a receiver accumulates as many of the redundancy blocks as are necessary to successfully decode. As another example, the redundancy blocks can be distributed over different frequencies in a frequency-division multiplexing system. As another example, the redundancy blocks can be spatially distributed if the channel has multiple-inputs, as would be the case in a multi-antenna system.

The techniques described herein have multiple important commercial applications. As such, the techniques described herein find application in processes carried out at the physical and media access control (MAC) layers in communication networks. One important, near-term opportunity for the techniques described herein is as a differentiating enhancement to the 802.16 (wimax/wibro) broadband wireless standard, currently being developed and implemented by several wireless companies.

The choice of linear transformations affects the performance of the system, as measured by, for example, transmission rate, power consumption, complexity, and error probability. Thus, some choices of linear transformations yield better performance, and some yield worse performance. In the prior art method of pseudorandom dithering, better and worse linear transformations are employed indiscriminately. In the present invention, proportionally more of the better linear transformations are chosen, and example of which corresponds to choosing the best linear transformations.

It should be appreciated that while in some applications constant linear transformations is the preferred embodiment, the linear transformations can be chosen in a pseudorandom manner.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before describing an encoding system and techniques associate therewith, some introductory concepts and terminology are explained.

Reference is sometimes made herein to an "original message" or more simply a "message." The message may be represented as a "sequence" or "stream" of digital bits which, may also be referred to as a "digital signal." In some cases, an analog or continuous parameter signal can be converted into a digital signal using known analog-to-digital conversion techniques. In this case, the values of the bits in the bit stream are selected such that the digital signal is a close representation of the analog or continuous parameter signal (within a selected error metric). The digital data values may be stored in a digital data storage device, such as a memory for example, as an array of numbers representing the message Reference is made herein to "linear transformations." Linear transformations are well-known in the art. One type of linear transformation is a matrix linear transformation, represented by an M by N matrix of complex numbers, where N is the length of a subcodeword to which the transformation applies, and M is the length of a redundancy block (such a matrix designated matrix A hereinbelow). The linear transformation acts on the subcodeword via left matrix multiplication. The matrix linear transformation may have additional structure.

A more general type of linear transformation is represented by a 2M by 2N matrix of real numbers and corresponds to independently transforming the (2N) real and imaginary parts of the complex-valued subcodeword into the (2M) real and imaginary parts of the complex-valued redundancy block. As is well-known in the art, this kind of linear transformation can equivalently be implemented within the complex representation provided that in addition to complex multiplication operations we allow complex conjugation operations, where complex conjugation corresponds to changing the sign of the imaginary part of a complex number. Another example of a linear transformation is a permutation, corresponding to reordering the elements of a codeword.

Yet another example of a linear transformation is the so-called Alamouti transformation, where by a pair of subcodeword symbols u1, u2 are transformed into the associated layer of one redundancy block as k*u1 and −k*conj(u2), and into the associated layer of a second redundancy block as k*u2 and k*conj(u1) in the corresponding positions, where k is a constant, * denotes multiplication, and conj( ) denotes complex conjugation. The Alamouti transformation is an example of what is referred to as an "orthogonal design". Other orthogonal designs exist for transforming two or more subcodeword symbols, as have been developed for space-time coding applications.

Still another example of a linear transformation is a linear transformation with shift, where a subcodeword is transformed by a matrix multiplication and then zero-symbols (or other known symbols) are inserted before, after, and/or within the symbols of resulting transformed subcodeword. This can equivalently be described by a larger overall matrix multiplication followed by addition of a vector of known symbols.

Reference is also sometimes made herein to "dither" or a "dither matrix." Dither is a particular form of a linear transformation. If the matrix A described above has nonzero entries only on the diagonal, it is said to be a dither matrix. It should be appreciated that dither can also be described using a "dither sequence." The two descriptions are equivalent—i.e. left matrix multiplication of a subcodeword by a dither matrix has the same action as applying a multiplicative dither sequence to the subcodeword, where the dither sequence is formed from the diagonal elements of the dither matrix. Dither sequences are sometimes composed entirely of $\{+1, -1\}$ elements, or four-phase elements $\{-1, 1, j, -j\}$, where j denotes the square root of −1. The simplest form of a dither matrix is one in which the diagonal elements are all equal (in which case the linear transformation is the same as multiplying the subcodeword by a constant). Another matrix structure is that of a block diagonal matrix form by taking a sequence of submatrices (for example, 3×3 matrices) and aligning them diagonally into a larger matrix, the rest of the matrix elements being zero.

Linear transformations can also be selected pseudorandomly. The randomization can be done once, when the system is designed, or online, each time a linear transformation must be selected. In any case (pseudorandom or deterministic), to facilitate decoding the selected linear transformations should be known at the receiver.

One way of characterizing a set of linear transformations is through correlation. Correlation can be measured in several ways. One way to measure correlation of two matrix transformations A and B is through their product $AB^H$, where superscript H denotes conjugate transpose. If the transformations A and B are pseudorandom, their correlation can be measured using the expected value $E(AB^H)$. If the transformations A and B are diagonal (i.e., if they are dither matrices), then their correlation $AB^H$ is also diagonal, and the overall correlation can be measured by averaging the diagonal elements together.

It should be appreciated that prior-art methods with pseudo-random $\{+1, -1\}$ dither have average correlation close to zero.

More complex measures of correlation are possible, for example, involving four linear transformations A1, A2, B1, B2, where A1 and A2 apply to subcodewords of a first redundancy block, and B1, B2 apply to subcodewords of a second redundancy block. One such measure is the product $A1\ A2^{-1}\ B2^{-H}\ B1^H$, or, for pseudo-random matrices, the expected product $E\ (A1\ A2^{-1}\ B2^{-H}\ B1^H)$. The advantage of the four-way correlation measure is that it is unaffected by a common phase shift applied to all subcodewords in a redundancy block. Such phase shifts do not generally impact performance, hence it is useful to have correlation measures that are transparent to them.

Reference is also made herein to the term "jointly related." Linear transformations (pseudo-random or deterministic) are said to be jointly related when knowledge of one linear transformation provides full or partial knowledge of others. For example, linear transformations that have substantially non-zero correlation are jointly related. Linear transformations that have substantially nonzero average correlation are also jointly related. Linear transformations that differ by a multiplicative complex constant are jointly related.

Reference is also sometimes made herein to a "jointly related dither." As used herein, the term "jointly related dither" refers to sets of linear transformations that are jointly related and also dithers. One form of jointly related dither is to hold the dither constant as a function of time t, so that the same dither $d_{m,l}$ applies to an entire codeword $c_{m,l(t)}$. It should, however, be appreciated that while constant dither is a preferred form of jointly related dither in some applications, in other applications other forms of jointly related dither may also be used.

Jointly related dithering is also distinct from prior art pseudorandom dithering techniques. In prior art random dithering techniques, knowledge of one linear transformation provides no knowledge of others. As a result, better and worse performing sets of linear transformations are used indiscriminately, where performance is measured by, for example, transmission rate, power consumption, complexity, and error probability.

Figure 1:
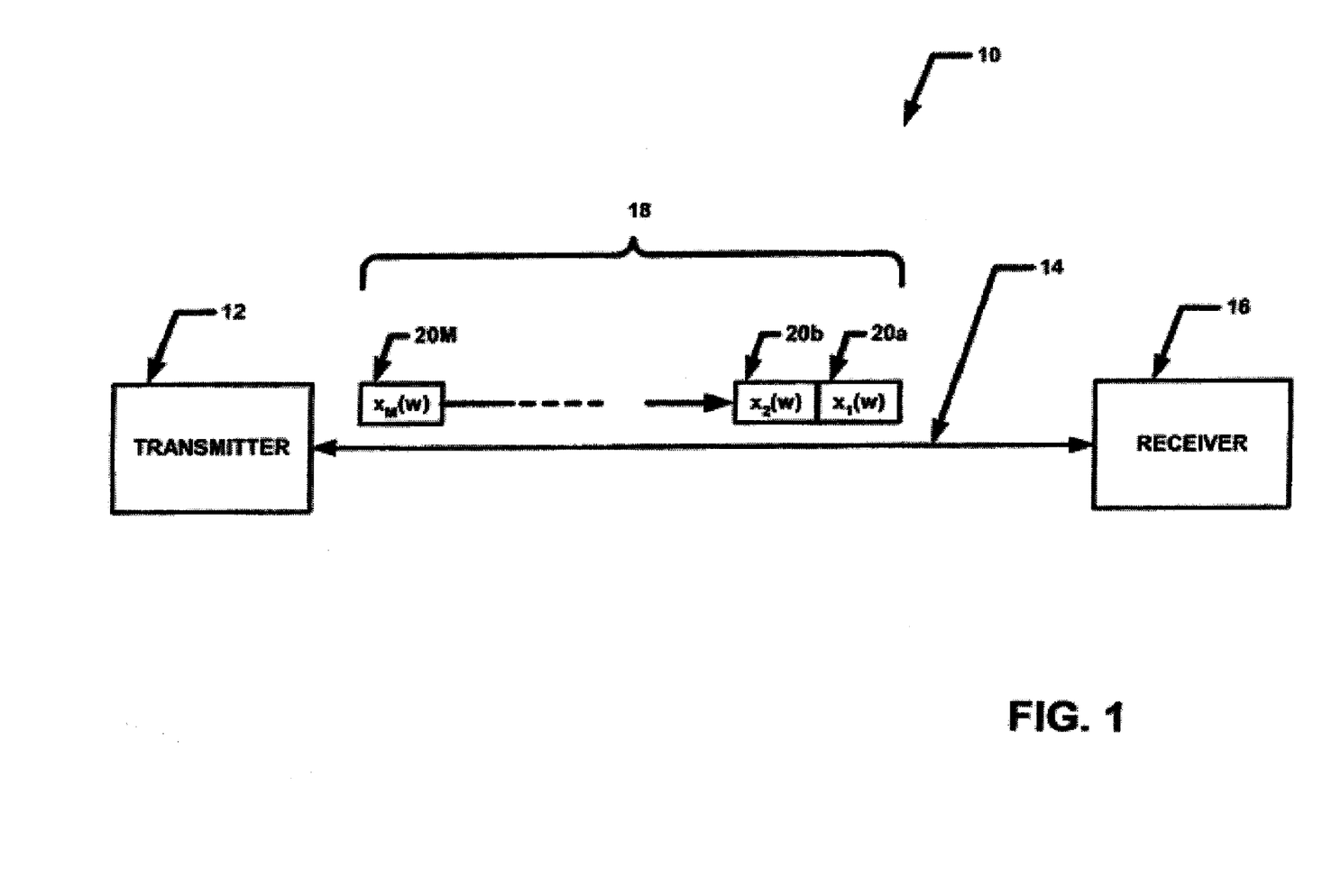
FIG. 1 is a block diagram of a transmit-receive system for transmission and reception of digital data which has been encoded using encoding techniques described herein in conjunction with FIGS. 2-4.

Referring now to FIG. 1, a transmit-receive system 10 includes a transmitter 12 in communication with a receiver 16 over a communication channel 14. Transmitter 12 begins with an unencoded message (not shown) and generates an encoded message 18 comprised of a plurality of redundancy blocks 20a-20M. One technique for generating the redundancy blocks 20a-20M which comprise the encoded message is described below in conjunction with FIG. 2.

Briefly, however, the encoded message 18 is generated by dividing an original message into a plurality of submessages, which are each encoded into a corresponding subcodeword, and selecting a first set of linear transformations to apply to the subcodewords. The first set of linear transformations includes at least one linear transformation for each subcodeword. The transmitter applies a first selected set of linear transformations to each of the plurality subcodewords to provide first transformed subcodewords and then combines the first transformed subcodewords to form a first redundancy block (e.g. redundancy block 20a) to be transmitted. The transmitter then applies a second selected set of linear transformations to the subcodewords to provide second transformed subcodewords. The second set of linear transformations also includes at least one linear transformation per subcodeword. The second set of linear transformations are selected to be nonidentical to the first selected set of linear transformations. The second transformed subcodewords are combined to form a second redundancy block to be transmitted.

The receiver 16 receives the message 18 and decodes the redundancy blocks to recover the original message.

Figure 2:
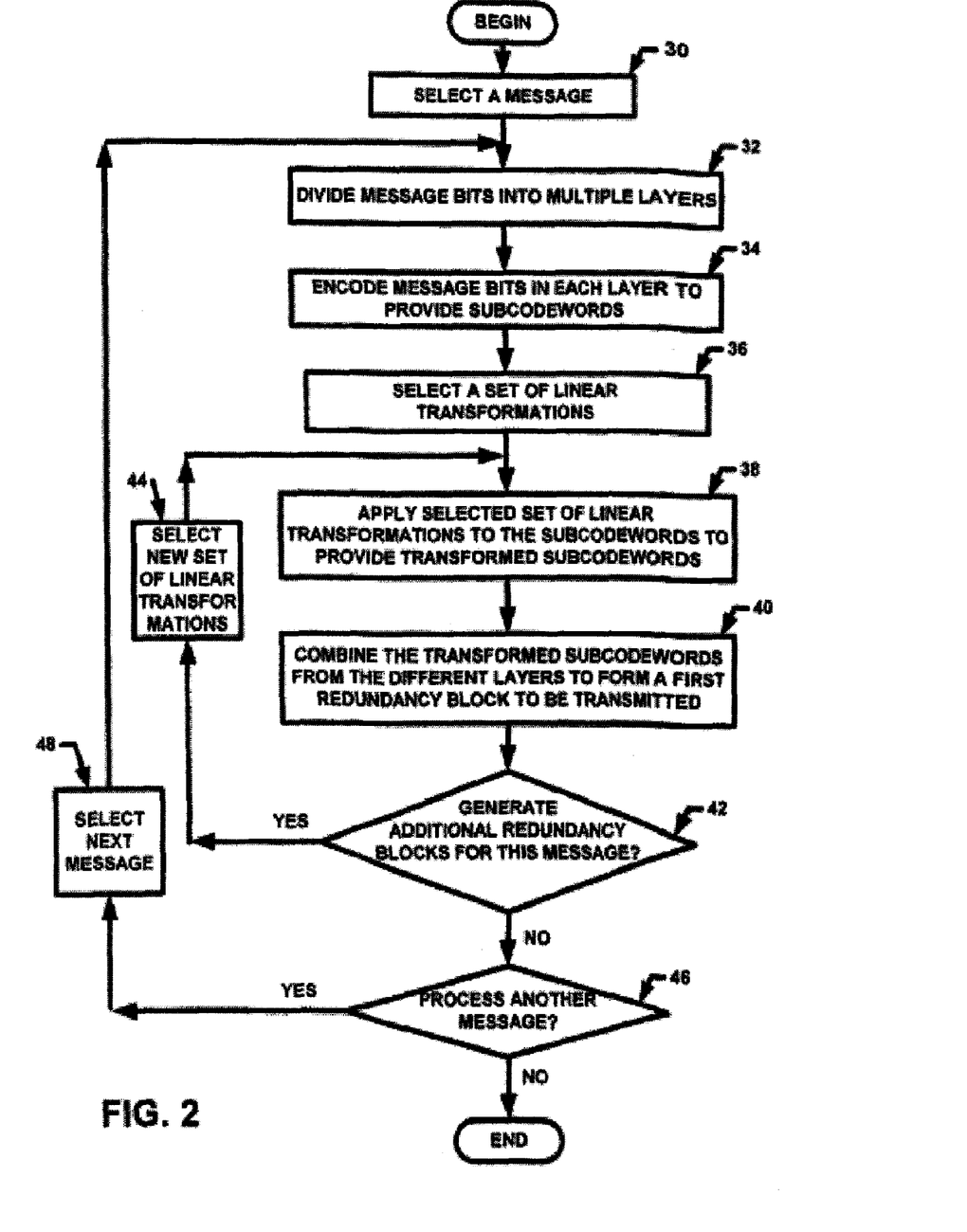
FIG. 2 is a flow diagram which shows a technique for encoding digital data for use is a system such as that shown in FIG. 1.

FIG. 2 is a flow diagram, which illustrates exemplary processing performed to generate redundancy blocks such as redundancy blocks 20a-20M described above in conjunction with FIG. 1. Such processing may be performed by a processing apparatus which may, for example, be provided as part of a transmitter system such as transmitter 12 shown in FIG. 1. The rectangular elements (e.g. block 30 in FIG. 2) in the flow diagram are herein denoted "processing blocks" and represent instructions or groups of instructions. Some of the processing blocks can represent an empirical procedure or a database operation while others can represent computer software instructions or groups of instructions. The diamond shaped elements in the flow diagrams (e.g. block 42 in FIG. 2) are herein denoted "decision blocks" and represent instructions or groups of instructions which affect the processing of the processing blocks. Thus, some of the processing associated with some of the blocks described in the flow diagram may be implemented via computer software while others may be implemented in a different manner e.g. via hardware, an empirical procedure and/or a database operation.

At least some of the functionality in at least some of the processing blocks can be performed by functionally equivalent circuits such as digital signal processor (DSP) circuits or application specific integrated circuits (ASICs). The flow diagram does not depict the syntax of any particular programming language. Rather, the flow diagram illustrates the functional information one of ordinary skill in the art requires to perform the functions or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Turning now to FIG. 2, processing begins processing in block 30 in which an original message is selected for transmission over a communication channel. Processing then proceeds to processing block 32 in which the message bits which comprise the original message are divided into multiple submessages. Processing then proceeds to processing block 34 in which the message bits in each submessage are encoded to provide subcodewords. Processing then proceeds to processing blocks 36 and 38 in which a set of linear transformations are selected and then applied to the subcodewords to provide a set of first transformed subcodewords. Processing then proceeds to processing block 40 where the transformed subcodewords are combined to form a first redundancy block to be transmitted (such as one of redundancy blocks 20a-20M in FIG. 1).

Processing then proceeds to decision block 42 in which a decision is made as to whether additional redundancy blocks are required to encode the entire message.

If in decision block 42, a decision is made that more redundancy blocks are required, then decision block 42 and processing block 44 form a loop in which a new set of linear transformations is selected (processing block 44) and then processing again flows to processing blocks 38-40.

If, on the other hand, in decision block 42 a decision is made that no additional redundancy blocks are required, then processing proceeds to processing block 46 in which a decision is made as to whether any additional messages remain to be processed. If a decision is made in decision block 46 that more messages should be processed, then decision block 46 and processing block 48 form a loop in which a new message is selected (processing block 48) and then processing again flows to processing blocks 32-46. If a decision is made in decision block 46 that no more messages should be processed, then processing ends and the output of the process is a sequence of redundancy blocks (e.g. the M redundancy blocks shown in FIG. 1).

Figure 3:
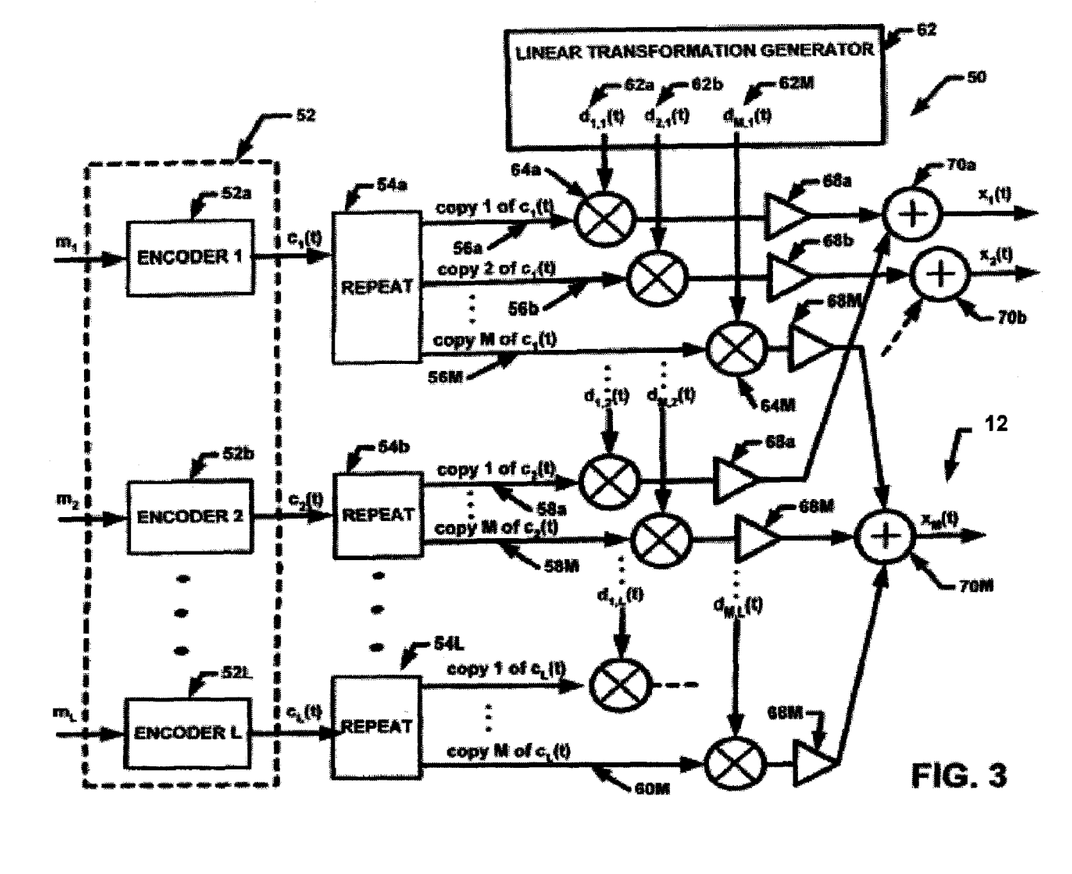
FIG. 3 is a block diagram of a system for encoding digital data for reliable transmission over a communication channel.

The invention may also be understood in terms of a block diagram when the linear transformations are in the form of dither. Referring now to FIG. 3, a transmitter 50 which may be the same as or similar to transmitter 12 described above in conjunction with FIG. 1 includes an encoder 52. In this exemplary embodiment, there are L submessages to be transmitted, $m_1$ through $m_L$, where L>1. Thus, in this exemplary embodiment, an encoder 52 is shown to be comprised of L encoder portions 52a-52L and each of the encoder portions 52a-52L receives one of the L submessages. It should also be appreciated that each message is comprised of a plurality of bits and that the submessages may be portions of some longer message, or may be separate messages in their own right. It should be appreciated that the messages need not have the same length, but it is often convenient for implementation purposes to have the lengths be equal.

Each of the respective encoders 52a-52L encodes the respective submessage (or message portion or message bits) provided thereto and provides a respective one of subcodewords $c_1(t)$-$c_L(t)$ at an output thereof. In one embodiment, the encoders 52a-52L are provided as error-control encoders which produce respective codewords $c_1(t)$ through $c_L(t)$. Each codeword $c_j(t)$ is a sequence of symbols $c_j(1)$, $c_j(2)$, $c_j(3)$, . . . . The symbols take on values that may be real or complex.

In preferred embodiments, the encoders 52a-52L produce different codewords, so that a receiver (e.g. receiver 16 in FIG. 1) can easily distinguish the output of one encoder from the output of any other encoder. This can be achieved, for example, by starting with a single base encoder, and producing the L encoders by applying L different pseudo-random scrambling sequences to the encoder output (e.g., by flipping the signs of the output sequences). Other forms of scrambling are well known in the art. One advantage of using a single base encoder with L different scramblers is that the encoding and decoding hardware (in a hardware implementation) may be shared L times. It should be appreciated that even if the input messages to the encoders 52a-52L have different lengths, the outputs of the encoders 52a-52L have the same length. This can be arranged by deleting or repeating output symbols, or by any of many other well-known methods for designing codes with a proscribed output symbol rate.

It should be understood that for the purposes of the present invention, scrambling of a codebook as described above is not considered to be the same as applying a dither. Thus, as used herein, the term "dither" does not encompass scrambling of a codebook.

Each of the subcodewords $c_1(t)$-$c_L(t)$ are provided to a respective one of repeaters 54a-54L. Each of the repeaters makes M copies (where M>1) of each the subcodewords provided thereto. For example, repeater 54a receives subcodeword $c_1(t)$ and makes M copies of subcodeword $c_1(t)$.

It should be appreciated that the copies are in correspondence with each other, so that, for example, the $m^{th}$ copy of codeword $c_1(t)$ is logically grouped with the $m^{th}$ copy of all other codewords. It should also be appreciated that literal copying is not needed in an implementation. In one embodiment of the invention, the copies are used sequentially, so that instead of copying, one can simply retain the codeword in a memory and use it a second or further time when a copy is required. In other embodiments, the copies are used in parallel, so that at time t the copies of symbols prior to time t can be discarded. In neither case do there exist multiple full copies of a codeword in memory although this would not be prohibited (i.e. if there were an advantage to retaining multiple full copies of a codeword, then this could be done). One can also perform copying by repeated encoding, that is, by repeating the input message and encoding it multiple times with the same encoder.

The message bits are next processed by applying a multiplicative linear transformation separately to each copied codeword. In FIG. 3 this is illustrated as applying a dither sequence $d_{m,l}(t)$ generated by linear transformation generator 62 to a codeword $c_{m,l}(t)$. Taking the processing of subcodeword $c_1(t)$ as illustrative of subcodewords $c_2(t)$-$c_L(t)$, each of the M subcodeword copies $c_1(t)$ from repeater 54a are provided to a first input of a respective one of M multiplier circuits 64a-64M. Thus, each of the M copies of subcodeword $c_1(t)$ is provided to an input of a respective one of multiplier circuits 64a-64M.

The linear transformation generator 62 thus provides a respective one of a plurality of dither signals $d_{m,l}(t)$ to a second input of each of the M multiplier circuits 64a-64M. It should be appreciated that linear transformation generator 62 provides a selected linear transformation to each of the subcodewords to provide a set of transformed subcodewords at the output of the multiplier circuits. In this way, a multiplicative structured dither, for example, can be separately applied to each copied codeword. Preferentially, the symbols in the dither sequence have magnitude 1.

Also in a preferred embodiment, the linear transformation is multiplication by a constant, where the constant factor differs for each subcodeword and each redundancy block, but is the same for every symbol within a subcodeword within a redundancy block.

In the example case of M=L=2, in one preferred embodiment the dither is constant within a subcodeword, and the dither values $d_{m,l}$, equal a for (m,l)=(1, 1), equal –a for (2,2), and equal b for (m,l)=(1,2) and (2, 1), where a and b are positive constants.

In other embodiments, the dither may be chosen by using standard numerical optimization software familiar to those of ordinary skill in the art. In such cases, the dither may be chosen to optimize combinations of transmission rate, power consumption, system complexity, and/or error probability.

Prior art methods for generating pseudorandom sequences are well known in the art, for example, using linear feedback shift registers or lookup tables. Pseudorandom sequences have the character of random sequences (for example, adjacent values are not correlated, the various dither symbols appear with approximately equal frequency, and so on), but they are known and nonrandom to the decoder.

It should also be appreciated that many types of dither are possible. If the codeword symbols are real, the dither sequence is preferentially a sequence of +1 and –1 values. Such sequences have the advantage of being easy to generate and easy to apply, because the +1 values have no impact on the sequence and the –1 values flip the sign of the code symbol. If the codeword symbols are complex, the dither sequence is preferentially a sequence of complex values drawn from +1, –1, j, –j, where j is the square root of –1.

After application of the linear transformation (e.g. dither), amplitude scaling is appropriately applied to each linear transformed, copied subcodeword via amplifiers 68a-68M. Thus, amplitude scaling $\alpha_{m,l}$ is applied to the $m^{th}$ copy of the $l^{th}$ linear transformed codeword via amplifiers 68a-68M. In a preferred embodiment, a different amplitude scaling factor is used for each subcodeword and each redundancy block.

It should be appreciated that in some embodiments, the linear transformation can also include amplitude scaling. This can be done by multiplying the linear transformation by an amplitude scaling constant.

Amplitude scaling is preferentially selected so that the total power of the transmitted sequence meets a selected average power constraint P. Amplitude scaling is also selected to enable certain types of efficient decoding, for example layered decoding whereby the receiver first recovers subcodeword $c_L(t)$ treating other subcodewords as noise, then removes the effects of $c_L(t)$ from the received sequence, then continues on to decode $c_{L-1}(t)$, and so on. Layered decoding is well known in the art, and the methods for computing the scaling amounts so that layered decoding may be used with little loss of performance are also known. (See for example U. Erez, M. D. Trott, G. W. Wornell, "Rateless Coding and Perfect Rate-Compatible Codes for Gaussian Channels," in Proc. Int. Symp. Inform. Theory (ISIT-2006), July 2006.)

The scaled sequences are then superposed (added together) to provide a transmitted sequence $x_m(t)$. That is, the dithered subcodewords from the different layers are combined in respective ones of combiner circuits 70a-70M to form a sequence of redundancy blocks $x_1(t)$-$x_M(t)$. The set of sequences $x_1(t)$ through $x_M(t)$ constitute the overall error control coding.

Figure 4:
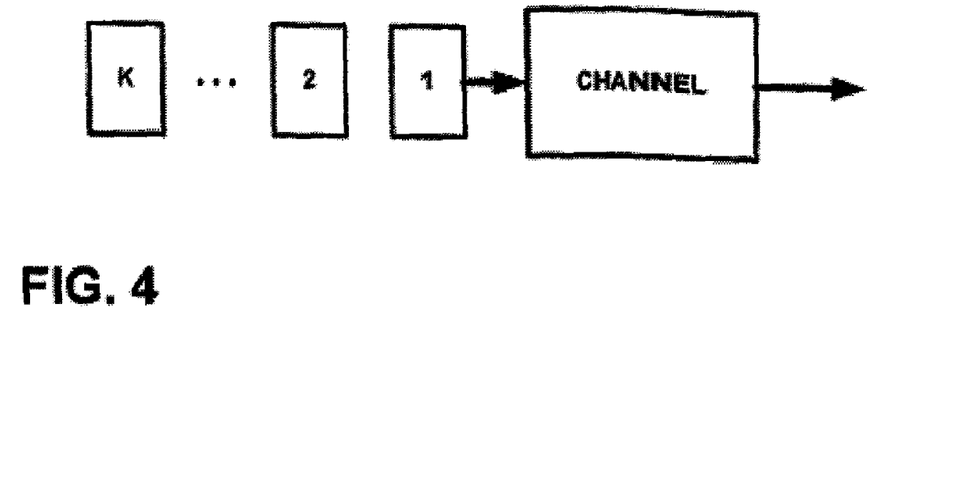
FIGS. 4, 4A and 4B are block diagrams of a system in which redundancy blocks are transmitted serially over a channel, for encoding digital data for reliable transmission over a communication channel.
Figure 4A:
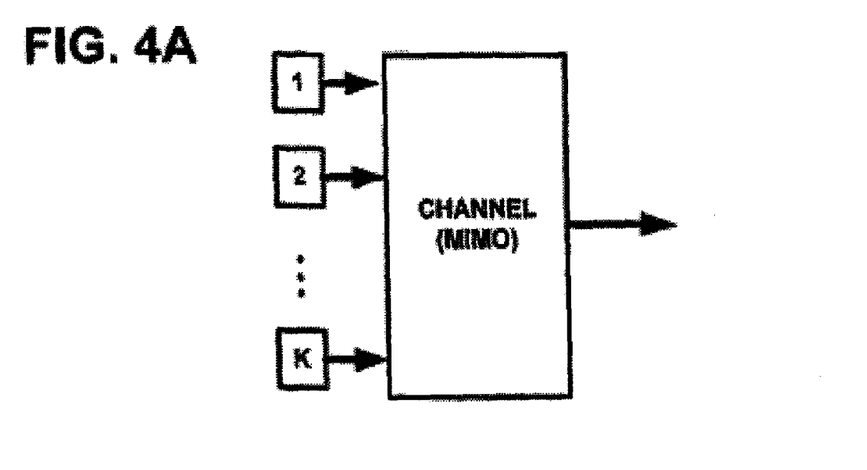
Figure 4B:
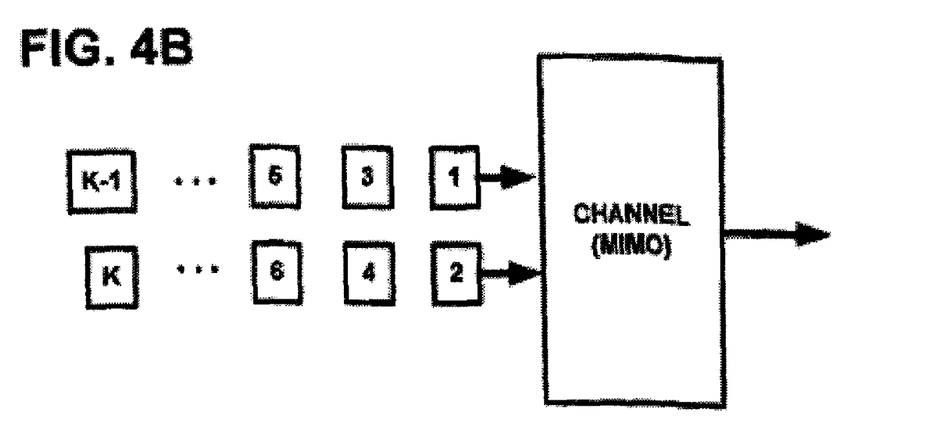

As will be described below in conjunction with FIGS. 4-4b the redundancy blocks can be transmitted over a communication channel in a variety of different ways. For example, the redundancy blocks can be sent serially (sequentially), in parallel or both serially and on parallel depending, at least in part, upon the characteristics of the channel and the particular application for which the redundancy blocks are being generated.

In one exemplary application, the sequences are distributed over time (for example, used in succession to form a rateless code). Alternatively, the sequences can be spatially distributed, e.g. over different antenna elements in a multiple-antenna wireless transmission system. Alternatively still, the sequences can be distributed over different frequency bands in a frequency-division multiplexing system, an example of which is an Orthogonal Frequency Division Multiplex (OFDM) system. Alternatively still, the sequences can be distributed over different orthogonal or nonorthogonal decompositions of the channel into subchannels, such as a Code Division Multiple Access (CDMA) system or the sequences can be distributed over combinations of time, space, frequency, and/or subchannels. Finally, in some applications, multiple users will each be performing this overall encoding and simultaneously transmitting to a common receiver. This would be the case in a multiple-access system.

The encoding method is particularly advantageous when different receivers receive different subsets of the transmitted sequences $x_m(t)$. For example, for "rateless coding", one receiver may receive only the first sequence $x_1(t)$, another receiver may receive only the first two sequences $x_1(t)$ and $x_2(t)$, and in general the $m^{th}$ receiver may receive only the first m sequences. The number of layers, the encoder rates, the amplitude scaling, and the decoding algorithms used by the receivers may be favorably configured so that all of the receivers are able to operate simultaneously and efficiently (i.e., so that the receivers achieve a low error rate at as low a signal strength as possible).

It should be clear that, as in the "copying" procedure described above (i.e. M copies of each codeword are produced), there are many equivalent ways to compute the transmitted sequence $x_m(t)$. For example, the linear transformation and scaling steps can be combined or their order can be swapped without affecting the output values. Similarly, the copying procedure can be combined or exchanged with the dithering and scaling procedures, again without affecting the output values. In an application such as OFDM where the sequences $x_1(t)$ through $x_M(t)$ are used in parallel (or equivalently, when encoding is done prior to transmission and stored in memory), the copying, linear transformation, and scaling procedures can be combined into a time-varying matrix multiplication.

Also, it should be appreciated that the techniques described herein can be combined with space time coding, as described in U. Erem, 6.W. Wornell, and M. B. Trott, "Rateless Space-Time Coding," in Proc. Int. Symp. Inform. Theory, (Adelaide, Australia), August. 2005. One way to achieve this is to insert an additional process for space-time coding e.g. between the encoder block 52 and the repeater block 54 in FIG. 2. One type of space-time code accepts a sequence of complex symbols as input, breaks the sequence into small chunks (e.g., four symbols per chunk), and encodes the chunks into complex vectors (e.g. eight vectors per chunk). The dimension of the output vectors equals the number of antennas that will be used for transmission. With this modification, all downstream steps must operate on vectors rather than scalars (e.g. vector repeating, vector linear transformation, vector scaling and vector superposition operations). Methods for operating on vectors are well-known to those of ordinary skill in the art.

The linear transformation is preferentially selected to yield good performance when decoded by a particular type of receiver.

One type of receiver sees only the first m redundancy blocks $x_1(t)$ through $x_m(t)$, and employs linear minimum mean squared error (MMSE) combining across these blocks. The receiver first decodes the $L^{th}$ submessage, then subtracts out the transformed subcodeword corresponding to the $L^{th}$ submessage, then combines via a different linear minimum mean squared error combiner to decode the $L-1^{st}$ submessage, and so on. The combining must be cognizant of the linear transformations, because the linearly transformed subcodewords that corresponded to undecoded submessages act as correlated noise.

Another type of receiver does not do minimum means squared error combining, but instead does maximum ratio combining (which ignores the correlation of undecoded layers). Performance is typically not as good for this receiver, and the linear transformations that maximize the performance of the maximum ratio combining receiver will in general differ from the linear transformations that maximize the performance of the minimum mean-squared error receiver.

In other cases, the receiver sees different possible subsets of $x_1(t)$ through $x_M(t)$. In still other cases, receiver sees all of $x_1(t)$ through $x_M(t)$, but the signal strength of each copy varies. (The previous cases may be thought of as a subcase where the signal strength is 0 for some of the $x_m(t)$.) The best linear transformations to use in each of these cases may differ.

Given a set of target receivers and receiver algorithms, one can mathematically express (or estimate or simulate) the performance of the set of receivers as a function of the linear transformation (e.g. as a function of the dither). In preferred embodiments, the linear transformation is selected to maximize the overall performance of the set of receivers. If the linear transformation is expressed as a matrix, and the performance is expressed in equation form, the problem can be loaded into a standard numerical optimization package to find a transformation matrix that maximizes overall receiver performance Also, one can apply an overall phase randomization to the output sequences without changing the performance of the structured system. This is also different from pseudorandom dither approaches of the prior art.

It should also be appreciated that in the present system and technique structured dither refers to a dither in which, the dither values at time t are jointly related, rather than being independent. One form of relationship is a pairwise phase relationship. For example, $d_{l,m}(t)$ and $d_{l',m}(t)$ have a constant relative phase, or a correlated relative phase.

Having described the preferred embodiments of the invention, it will now become apparent to one of ordinary skill in the art that other embodiments incorporating their concepts may be used.

For example, after applying constant or time-varying dithers to the subcodewords that comprise a redundancy block, it is possible to insert zero-symbols prior to combining. Specifically, for some choice of K, in the l-th layer (l=1, 2, ..., L) one would prepend (l−1)N/K zero symbols to the transformed subcodeword, and append additional zero symbols to the transformed subcodeword so as to make the overall expanded subcodeword equal to the length of the redundancy block. Equivalent implementations of this "shifted layering" embodiment are also possible.

Yet another exemplary embodiment includes two antennas at a transmitter (e.g. corresponding to a MIMO channel). In such an embodiment, two redundancy blocks directed to respective ones of the two transmitter antennas correspond to using a linear transformation in which consecutive pairs of subcodeword symbols in each layer are transformed using Alamouti transformation, where different values of the parameter k are used in different layers. It will be appreciated by those of ordinary skill in the art that many variations of this basic design are also possible.

It is felt therefore that these embodiments should not be limited to disclosed embodiments but rather should be limited only by the spirit and scope of the appended claims. All publications and references cited herein are expressly incorporated herein by reference in their entirety.

The invention claimed is:

1. A computer implemented method for encoding a message for transmission over a communication channel, the method comprising:
   encoding, by a computer, the message into a plurality of subcodewords;
   selecting, by said computer, a first set of linear transformations (S1) wherein S1 includes at least one linear transformation per subcodeword;
   defining, by said computer, a first and second linear transformation in S1 as transformations associated with a first and second subcodeword, respectively;
   applying, by said computer, S1 to the plurality of subcodewords to provide a plurality of first transformed subcodewords;
   combining, by said computer, the plurality of first transformed subcodewords to form a first redundancy block to be transmitted;
   selecting, by said computer, a second set of linear transformations (S2) wherein S2 includes at least one linear transformation per subcodeword;
   defining, by said computer, a first and second linear transformation in S2 as transformations associated with said first and second subcodeword, respectively, wherein the first linear transformations in S1 and S2 are jointly related, wherein the second linear transformations in S1 and S2 are jointly related, and wherein the joint relationship between said first linear transformations and said second linear transformations is nonidentical;
   applying, by said computer, S2 to the plurality of subcodewords to provide a plurality of second transformed subcodewords; and
   combining, by said computer, the second transformed subcodewords to form a second redundancy block to be transmitted.

2. The method of claim 1 wherein said first set of linear transformations are dithers.

3. The method of claim 2 wherein the dithers have substantially nonzero average correlation.

4. The method of claim 1 wherein said first set of linear transformations are multiplications by constants.

5. The method of claim 4 wherein said second set of linear transformations are multiplications by constants, and wherein the joint relationship between the first set of linear transformations is a first ratio, and wherein the joint relationship between the second set of linear transformations is a second ratio, where the first and second ratios differ.

6. The method of claim 1 wherein said first set of linear transformations are random transformations having nonzero correlation.

7. The method of claim 1 wherein said first set of linear transformations are jointly related so as to correspond to i) applying an orthogonal design, and then ii) multiplying each symbol of each of the resulting first and second transformed subcodewords by a complex constant.

8. The method of claim 7 wherein said orthogonal design is an Alamouti transformation.

9. The method of claim 1 wherein said first set of linear transformations are permutations.

10. The method of claim 1 wherein said first set of linear transformations include shifted layering.

11. The method of claim 1 wherein no two linear transformations in S1 correspond to the same subcodeword, and no two linear transformations in S2 correspond to the same subcodeword.

12. The method of claim 1 further comprising using said first redundancy block and said second redundancy block to generate a waveform for transmission, wherein using said first redundancy block and said second redundancy block to generate the waveform for transmission comprises one of the group consisting of using said first redundancy block and said second redundancy block at different times, distributing said first redundancy block and said second redundancy block over different frequencies in a frequency-division multiplexing system, and spatially distributing said first redundancy block and said second redundancy block for a channel that has multiple inputs.

13. A non-transitory computer readable medium having computer readable code thereon executable by a processor for encoding a message for transmission over a communication channel, the medium comprising instructions for:
   encoding the message into a plurality of subcodewords;
   selecting a first set of linear transformations (S1) wherein S1 includes at least one linear transformation per subcodeword;
   defining a first and second linear transformation in S1 as transformations associated with a first and second subcodeword, respectively;
   applying S1 to the plurality of subcodewords to provide a plurality of first transformed subcodewords;
   combining the plurality of first transformed subcodewords to form a first redundancy block to be transmitted;
   selecting a second set of linear transformations (S2) wherein S2 includes at least one linear transformation per subcodeword;
   defining a first and second linear transformation in S2 as transformations associated with said first and second subcodeword, respectively, wherein the first linear transformations in S1 and S2 are jointly related, wherein the second linear transformations in S1 and S2 are jointly related, and wherein the joint relationship between said first linear transformations and said second linear transformations is nonidentical;
   applying S2 to the plurality of subcodewords to provide a plurality of second transformed subcodewords; and
   combining the second transformed subcodewords to form a second redundancy block to be transmitted.

14. The computer readable medium of claim 13 wherein said first set of linear transformations are dithers.

15. The computer readable medium of claim 14 wherein the dithers have substantially nonzero average correlation.

16. The computer readable medium of claim 13 wherein said first set of linear transformations are multiplications by constants.

17. The computer readable medium of claim 16 wherein said second set of linear transformations are multiplications by constants, and wherein the joint relationship between the first set of linear transformations is a first ratio, and wherein the joint relationship between the second set of linear transformations is a second ratio, where the first and second ratios differ.

18. The computer readable medium of claim 13 wherein said first set of linear transformations are random transformations having nonzero correlation.

19. The computer readable medium of claim 13 wherein said first set of linear transformations are jointly related so as to correspond to i) applying an orthogonal design, and then ii) multiplying each symbol of each of the resulting first and second transformed subcodewords by a complex constant.

20. The computer readable medium of claim 19 wherein said orthogonal design is an Alamouti transformation.

21. The computer readable medium of claim 13 wherein said first set of linear transformations are permutations.

22. The computer readable medium of claim 13 wherein said first set of linear transformations include shifted layering.

23. The computer readable medium of claim 13 wherein no two linear transformations in S1 correspond to the same subcodeword, and no two linear transformations in S2 correspond to the same subcodeword.

24. The computer readable medium of claim 13 further comprising using said first redundancy block and said second redundancy block to generate a waveform for transmission, wherein using said first redundancy block and said second redundancy block to generate the waveform for transmission comprises one of the group consisting of using said first redundancy block and said second redundancy block at different times, distributing said first redundancy block and said second redundancy block over different frequencies in a frequency-division multiplexing system, and spatially distributing said first redundancy block and said second redundancy block for a channel that has multiple inputs.

* * * * *